United States Patent
Gao

(10) Patent No.: US 11,496,611 B2
(45) Date of Patent: Nov. 8, 2022

(54) TRANSMITTING METHOD, RECEIVING METHOD, TRANSMITTING DEVICE, AND RECEIVING DEVICE FOR CONTROL INSTRUCTION IN LONG-DISTANCE TRANSMISSION

(71) Applicant: SHENZHEN LENKENG TECHNOLOGY CO., LTD, Shenzhen (CN)

(72) Inventor: Binghai Gao, Shenzhen (CN)

(73) Assignee: SHENZHEN LENKENG TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 17/327,782

(22) Filed: May 24, 2021

(65) Prior Publication Data

US 2022/0103657 A1 Mar. 31, 2022

(30) Foreign Application Priority Data

Sep. 30, 2020 (CN) .......................... 202011063004.6

(51) Int. Cl.
*H04L 69/164* (2022.01)
*H04L 12/46* (2006.01)
*H04L 69/22* (2022.01)
*H04Q 11/00* (2006.01)

(52) U.S. Cl.
CPC ........ *H04L 69/164* (2013.01); *H04L 12/4633* (2013.01); *H04L 69/22* (2013.01); *H04Q 11/0066* (2013.01); *H04Q 2011/0088* (2013.01)

(58) Field of Classification Search
CPC ... H04L 69/164; H04L 12/4633; H04L 69/22; H04Q 11/0066; H04Q 2011/0088
See application file for complete search history.

(56) References Cited

U.S. PATENT DOCUMENTS

| 7,061,942 B2* | 6/2006 | Noronha, Jr. .... H04N 21/23608 370/219 |
| 2003/0133458 A1* | 7/2003 | Sato ........................ H04L 45/16 370/395.6 |
| 2018/0234187 A1* | 8/2018 | Zhang ................ H04N 21/6118 |
| 2019/0364492 A1* | 11/2019 | Azizi ................ H04W 52/0261 |

* cited by examiner

*Primary Examiner* — Mohamed A. Wasel
(74) *Attorney, Agent, or Firm* — Bayramoglu Law Offices LLC

(57) ABSTRACT

Disclosed is a transmitting method for a control instruction in long-distance transmission. The transmitting method includes the follows. A transmitting device obtains a first control instruction. The transmitting device encapsulates the first control instruction through a user datagram protocol (UDP) protocol to obtain a UDP packet. The transmitting device transmits the UDP packet to a first communication module via an input interface of the first communication module. With this disclosure, ultra-low latency transmission of the control instruction between devices in long-distance transmission can be achieved.

20 Claims, 4 Drawing Sheets

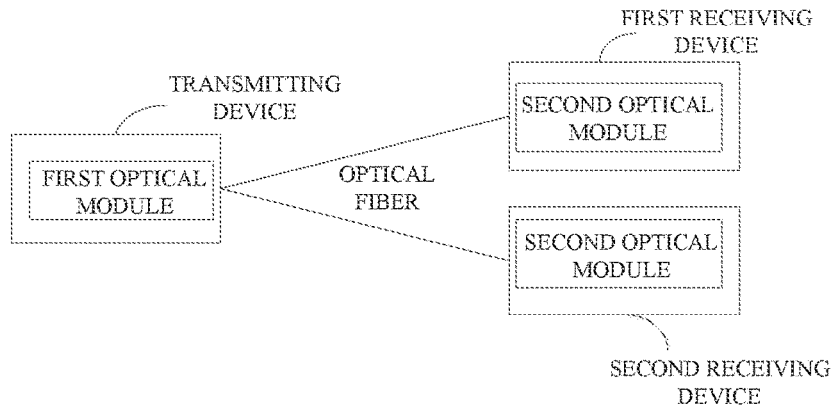
FIG. 8
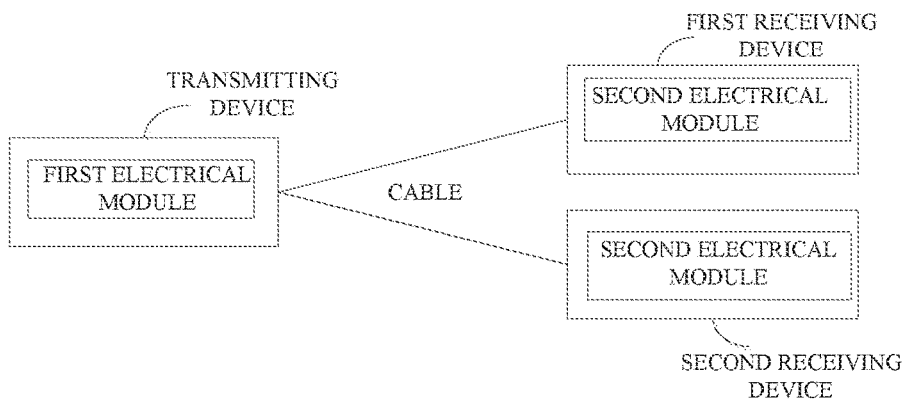
FIG. 9
| Obtaining, by a receiving device, a user datagram protocol (UDP) packet from a second communication module via an output interface of the second communication module | ⟋ 101 |
| Decapsulating, by the receiving device, the UDP protocol packet through a UDP communication protocol to obtain a first preset control instruction | ⟋ 102 |
FIG. 10

TRANSMITTING METHOD, RECEIVING METHOD, TRANSMITTING DEVICE, AND RECEIVING DEVICE FOR CONTROL INSTRUCTION IN LONG-DISTANCE TRANSMISSION

CROSS REFERENCE TO RELATED APPLICATION

The present application claims priority to Chinese Patent Application Serial No. 202011063004.6 on Sep. 30, 2020, the disclosure of which is herein by incorporated by reference.

TECHNICAL FIELD

The disclosure relates to the technical field of network communication, and particularly to a transmitting method, a receiving method, a transmitting device, and a receiving device for a control instruction in long-distance transmission.

BACKGROUND

With the advancement of society and the development of science and technology, especially the development of Internet of Things technology, the Internet of Things networking of various traditional devices has become a trend.

At present, in long-distance transmission, the transmission of control instructions between most traditional devices (e.g., the transmission of control instructions between control devices on the side of video source devices such as set-top boxes and display devices; or the transmission of control instructions between video source devices such as set-top boxes and control devices on the side of display devices) has a long-time delay, and the user experience is relatively low.

SUMMARY

Based on the above problems and the shortcomings of the prior art, the disclosure provides a transmitting method, a receiving method, a transmitting device and a receiving device for a control instruction in long-distance transmission, which can realize ultra-low latency transmission of control instructions between devices in long distance.

In a first aspect, the disclosure provides a transmitting method for a control instruction in long-distance transmission, where the transmitting method includes the following.

A transmitting device obtains a first control instruction.

The transmitting device encapsulates the first control instruction via a user datagram protocol (UDP) to obtain a UDP packet.

The transmitting device transmits the UDP packet to a first communication module via an input interface of the first communication module.

In a second aspect, the disclosure provides a receiving method for a control instruction in long-distance transmission, where the receiving method includes the follows.

A receiving device obtains a UDP packet from a second communication module via an output interface of the second communication module.

The receiving device decapsulates the UDP packet via the UDP communication protocol to obtain a first preset control instruction, where the first preset control instruction is used by the receiving device to control a display device connected to the receiving device.

In a third aspect, the disclosure provides a transmitting device for a control instruction in long-distance transmission. The transmitting device comprises a first memory and a first processor coupled to the first memory. The first memory is configured to store a first application program instruction. The first processor is configured to invoke the first application program instruction to execute the transmitting method for a control instruction described in the first aspect.

In a fourth aspect, the disclosure provides a receiving device for a control instruction in long-distance transmission. The receiving device comprises a second memory and a second processor coupled to the second memory. The second memory is configured to store a second application program instruction. The second processor is configured to invoke the second application program instruction to execute the receiving method for a control instruction described in the second aspect.

BRIEF DESCRIPTION OF THE DRAWINGS

In order to explain the technical solutions in implementations of the disclosure more clearly, the drawings used in the description of the implementations are briefly introduced below. Obviously, the drawings in the following description are some implementations of the disclosure. For ordinary technicians, other drawings can be obtained based on these drawings without paying creative work.

FIGS. 2-9 are schematic structural diagrams of the transmitting method for a control instruction in long-distance transmission according to the disclosure.

FIG. 10 is a schematic flowchart of a receiving method for a control instruction in long-distance transmission according to the disclosure.

DETAILED DESCRIPTION

The technical solutions in the disclosure will be clearly and completely described below in conjunction with the drawings in the disclosure. Obviously, the described embodiments are some but not all of the embodiments of the disclosure.

Figure 1:
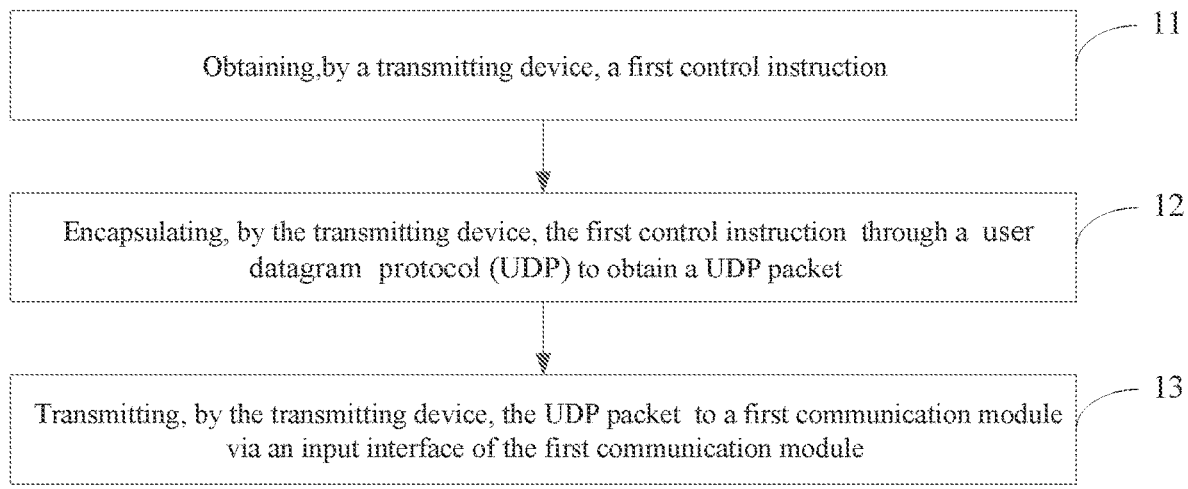
FIG. 1 is a schematic flowchart of a transmitting method for a control instruction in long-distance transmission according to the disclosure.

FIG. 1 is a schematic flowchart of a transmitting method for a control instruction in long-distance transmission according to the disclosure. As shown in FIG. 1, the transmitting method for a control instruction may include, but is not limited to, the following.

At block 11, a first control instruction is obtained by a transmitting device.

According to an embodiment of the disclosure, the first control instruction is obtained by the transmitting device may include, but is not limited to, the following.

Method 1

The first control instruction is obtained by the transmitting device from a first control device via a first USB interface, where the first universal serial bus (USB) interface is integrated into the transmitting device, where the first control instruction may include, but is not limited to, device reboot, volume adjustment, brightness adjustment and other control instructions.

It should be noted that, before the first control instruction is obtained by the transmitting device from the first control device via the first USB interface, the first control instruction inputted from a user (e.g., user click, space separated touch mouse, user tap, space separated touch keyboard) may be received by the first control device. The first control device may include, but is not limited to, a mouse or a keyboard.

Method 2

The first control instruction is obtained by the transmitting device from the first control device via a first RS232 interface, and the first RS232 interface is integrated into the transmitting device.

It should be noted that before the first control instruction is obtained by the transmitting device from a first control device via the first RS232 interface, where the first control instruction input from the user (e.g., user click, space separated touch mouse, user tap, space separated touch keyboard) may be received by the first control device.

Method 3

Step 1, the transmitting device receives a first infrared signal via a first infrared receiving tube and converts the first infrared signal into a first control electrical signal.

Specifically, the transmitting device receives, via the first infrared receiving tube, the first infrared signal transmitted by the remote control and converts the first infrared signal into the first control electrical signal, it should be noted that before the transmitting device receives, via the first infrared receiving tube, the first infrared signal transmitted by the remote control, the remote control receives a first control instruction input from a user (e.g., a user pressing or space separated touch a button on the remote control). The first infrared receiving tube comprises an infrared receiving tube integrated into the transmitting device and the infrared receiving tube can be used to receive the infrared signal.

Step 2, the transmitting device performs, by a first analog-to-digital conversion module, analog-to-digital conversion of the first control electrical signal to obtain a first control instruction.

Method 4

The first control instruction is obtained by the transmitting device from the first control device via a first I2C interface, where the first I2C interface is integrated into the transmitting device.

Method 5

The first control instruction is obtained by the transmitting device from the first control device via a third RJ-45 interface, where the third RJ-45 interface is integrated into the transmitting device.

Method 6

The first control instruction is obtained by the transmitting device from the first control device via a first serial peripheral interface (SPI) interface; the first SPI interface is integrated into the transmitting device.

At block 12, the first control instruction may be encapsulated by the transmitting device through a user datagram protocol (UDP) to obtain a UDP packet.

Specifically, the transmitting device adds a UDP protocol header and a UDP protocol tail to the first control instruction to obtain a UDP packet comprising the first control instruction, the UDP protocol header, and the UDP protocol tail, where the UDP protocol header or UDP protocol tail may contain control information such as a destination address, a source address, a port number, and a marker bit, respectively.

At block 13, the UDP packet may be transmitted by the transmitting device to a first communication module via an input interface of the first communication module.

According to an embodiment of the disclosure, the transmitting device transmits the UDP packet to the first communication module via the input interface of the first communication module, which may include, but is not limited to, the following.

Method 1

The UDP packet is transmitted by the transmitting device to a first optical module via an input interface of the first optical module. The first optical module is used to convert the UDP packet into an optical signal, where the first optical module may be a single-fiber single-mode optical module with a transmission rate no lower than the first threshold or may be a single-fiber multi-mode optical module with a transmission rate no lower than the first threshold. Optionally, the first threshold may be 10 Gbps and is not limited herein.

Method 2

The UDP packet is transmitted by the transmitting device to a first electrical module via an input interface of the first electrical module. The first electrical module may be an electrical module with a transmission rate no less than a first threshold. The electrical module with the transmission rate no less than the first threshold comprises a first physical transceiver (PHY) and a first RJ-45 interface, where the first physical transceiver comprises a physical transceiver, the first RJ-45 interface comprises an RJ-45 interface.

It should be noted that the transmitting method further comprises the following.

After the transmitting device transmits the UDP packet to a first optical module via an input interface of the first optical module, the transmitting device converts the UDP packet into an optical signal by the first optical module and transmits the optical signal to the switch, where the switch is configured to forward the optical signal to a receiving device connected to the switch.

It should be noted that the switch in this disclosure may comprise a gigabit switch or a 10 gigabit switch; the switch may also be a stacked switch.

Figure 2:
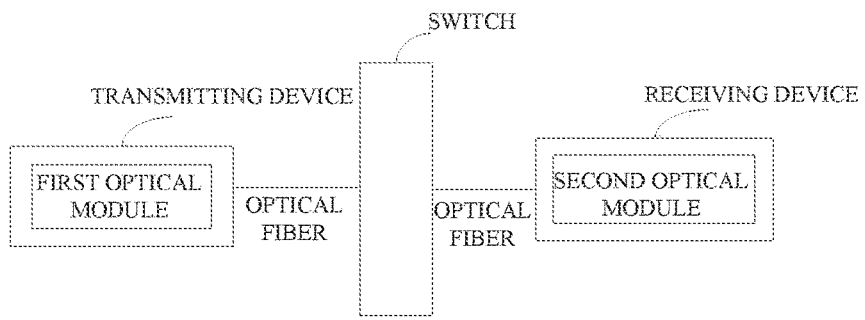

As shown in FIG. 2, the transmitting device transmits the UDP packet to the switch by a first optical module and based on fiber (e.g., single-fiber single-mode, single-fiber multi-mode), and the receiving device can obtain the UDP packet from the switch by a second optical module and based on fiber.

It should be noted that when the receiving device comprises a first receiving device and a second receiving device, the transmitting method may further include the following steps.

After the transmitting device transmits the UDP packet to the first optical module via an input interface of the first optical module, the transmitting device converts the UDP packet into an optical signal by the first optical module, and transmits the optical signal to the switch when the switch is connected to the receiving device, the switch is used to forward the optical signal to the first receiving device and the second receiving device respectively.

Figure 3:
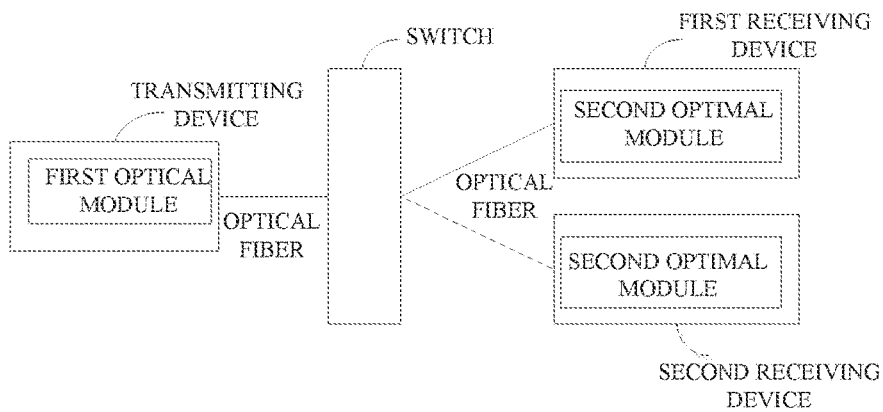

As shown in FIG. 3, the transmitting device transmits the UDP packet to the switch by a first optical module and based on fiber. The first receiving device may obtain the UDP packet from the switch by an internally integrated second optical module and based on fiber, and the second receiving device may obtain the UDP packet from the switch by the internally integrated second optical module and based on fiber.

It should be noted that after the transmitting device transmits the UDP packet to the first electrical module via an input interface of the first electrical module, the transmitting method may further include the following.

The transmitting device will transmit the UDP packet to the switch by the first electrical module; where the switch is configured to forward the UDP packet to a receiving device connected to the switch. The first electrical module comprises an electrical module with a transmission rate no less than a first threshold.

When the first electrical module comprises a first physical interface transceiver and a first RJ-45 interface, specifically, the transmitting device may transmit the UDP packet to the first physical interface transceiver via an input interface of the first physical interface transceiver (e.g., XF1, XAUX, RAUX), and it should be noted that the transmitting device may output the UDP packet via the first physical interface transceiver to the switch via the first RJ-45 interface.

Figure 4:
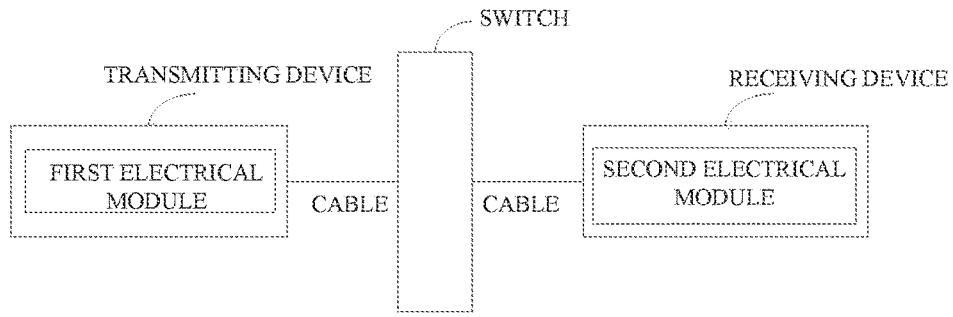

As shown in FIG. 4, the transmitting device transmits, the UDP packet to the switch by the first electrical module and based on the network cable (e.g., CAT5, CAT5E, CAT6, CAT6E), and the receiving device can obtain the UDP packet from the switch by the second optical module and based on the network cable.

It should be noted that when the receiving device comprises a first receiving device and a second receiving device, the transmitting method may further include the following.

After the transmitting device transmits the UDP packet to the first electrical module via an input interface of the first electrical module, the transmitting device will transmit the UDP packet to the switch by the first electrical module. The switch is configured to forward the UDP packet to the first receiving device and the second receiving device respectively when the switch is connected to the receiving device.

Figure 5:
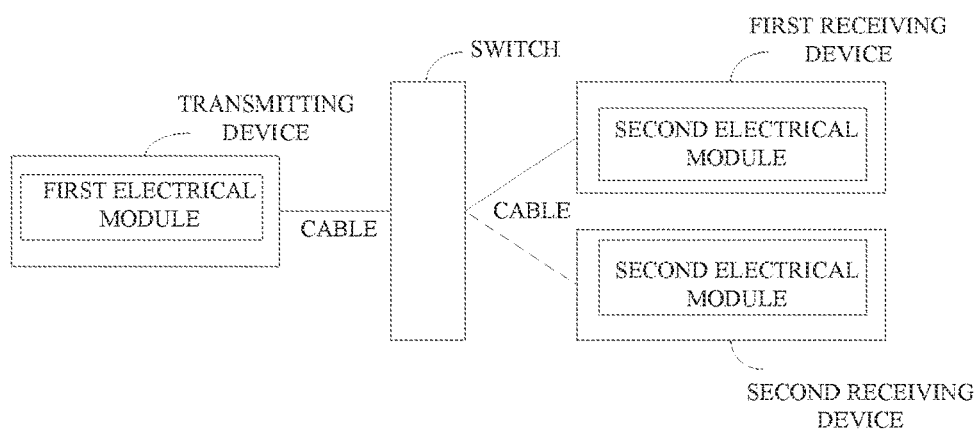

As shown in FIG. 5, the transmitting device transmits the UDP packet to the switch by the first electrical module and based on a network cable. The first receiving device may obtain the UDP packet from the switch by the internally integrated second electrical module and based on a network cable, and the second receiving device may obtain the UDP packet from the switch by the internally integrated second electrical module and based on a network cable.

It should be noted that the transmitting method may further comprise the following methods.

Method 1

After the transmitting device transmits the UDP packet to the first optical module via an input interface of the first optical module, the transmitting device converts the UDP packet into an optical signal by the first optical module, and transmits the optical signal to the receiving device.

Figure 6:
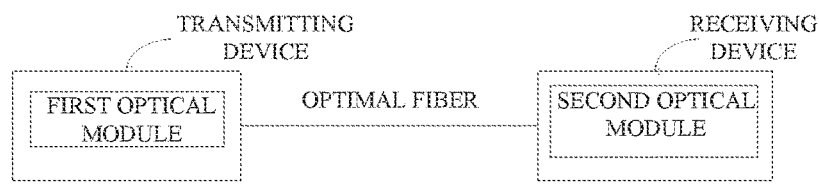

As shown in FIG. 6, the transmitting device transmits the UDP packet to the receiving device by the first optical module and based on the optical fiber, and the receiving device obtains the UDP packet from the transmitting device by the second optical module based on the optical fiber.

Method 2

The transmitting device will transmit the UDP packet to the receiving device by the first electrical module.

Figure 7:
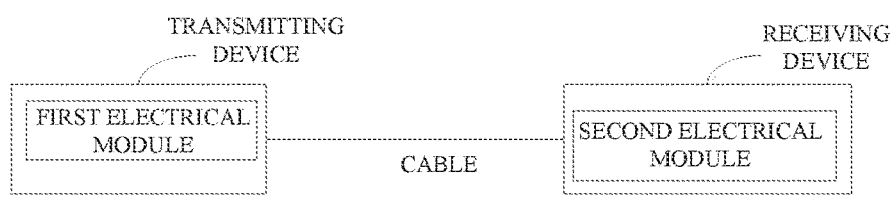

As shown in FIG. 7, the transmitting device transmits the UDP packet to the receiving device by the first electrical module and based on the network cable, and the receiving device obtains the UDP packet from the transmitting device by the second electrical module based on the network cable.

When the first electrical module comprises a first physical interface transceiver and a first RJ-45 interface, specifically, the transmitting device may transmit the UDP packet to the first physical interface transceiver via an input interface of the first physical interface transceiver (e.g., XF1, XAUX, RAUX), and it should be noted that the transmitting device may output the UDP packet via the first physical interface transceiver to the receiving device via the first RJ-45 interface.

It should be noted that when the receiving device comprises a first receiving device and a second receiving device, the transmitting method may further include the following methods.

Method 1

After the transmitting device transmits the UDP packet to the first optical module via an input interface of the first optical module, the transmitting device converts the UDP packet into an optical signal by the first optical module, and transmits the optical signal to the first receiving device and the second receiving device respectively.

As shown in FIG. 8, the transmitting device transmits the UDP packet to the first receiving device and the second receiving device by the first optical module and based on optical fiber, respectively. The first receiving device may obtain UDP packet from the transmitting device by the internally integrated second optical module and based on optical fiber, and the second receiving device may obtain the UDP packet from the transmitting device by the internally integrated second optical module and based on optical fiber.

Method 2

The transmitting device transmits the UDP packet to the first receiving device and the second receiving device respectively by the first electrical module.

As shown in FIG. 9, the transmitting device transmits the UDP packet to the first receiving device and the second receiving device by the first electrical module and based on the network cable, respectively. The first receiving device may obtain the UDP packet from the transmitting device by the internally integrated second electrical module and based on the network cable, and the second receiving device may obtain the UDP packet from the transmitting device by the internally integrated second optical module and based on the network cable.

It should be noted that the transmitting device transmits the UDP packet to the first optical module via an input interface of the first optical module, and transmits the UDP packet to the first electrical module at the same time.

It should be noted that the transmitting device transmits the UDP packet to the first communication module via the input interface of the first communication module further comprise the following.

In addition to transmitting the UDP packet to the first optical module via the input interface of the first optical module, the transmitting device may also transmit the UDP packet to the first electrical module via the input interface of the first physical interface transceiver in the first electrical module.

It should be noted that the transmitting method may also include the following steps.

Step 1, the transmitting device receives a received preset UDP packet, and decapsulates the received preset UDP packet to obtain a second preset control instruction.

Step 2, the transmitting device performs a first digital-to-analog conversion of the second preset control instruction by a first digital-to-analog conversion module to obtain a second preset control electrical signal.

Step 3, the transmitting device controls the first infrared tube to emit the second preset infrared signal according to the second preset control signal, where the second preset infrared signal is used for the transmitting device to control the video source device connected to the transmitting device.

The first infrared emitting tube is an infrared emitting tube integrated into the transmitting device for emitting infrared signal. The video source device may include, but is not limited to, DVD, set-top box, or camera, etc.

It should be noted that the transmitting device may also obtain audio and video data from the first control device via a third RJ-45 interface.

It should be noted that the transmitting method further comprises the following.

The transmitting device transmits the UDP packet to the first communication module via the input interface of the first communication module, designs the UDP packet input to the first communication module into a plurality of cyclic superframes, and transmits the plurality of cyclic superframes to the receiving device or switch, where the individual UDP packet in the superframes occupies a fixed proportion of time.

Where the above-mentioned UDP packet input to the first communication module comprises at least one of the following UDP packets.

The UDP packet encapsulated with a first control instruction obtained via a first USB interface, the UDP packet encapsulated with the first control instruction obtained via a first RS232 interface, the UDP packet encapsulated with the first control instruction obtained via the first I2C interface, the UDP packet encapsulated with the first control instruction converted from the first infrared signal received by the first infrared receiving tube, or the UDP packet encapsulated with the first control instruction obtained via the third RJ-45 interface.

It should be noted that the transmitting device designs the UDP packet input to the first communication module as a plurality of cyclic superframes, which may include the following steps.

The transmitting device designs the UDP packets input to the first communication module and the UDP packet encapsulated with audio and video data input to the first communication module as a plurality of cyclic superframes.

It should be noted that FIGS. 2-9 are used only to explain the embodiments of the disclosure and should not limit the disclosure.

FIG. 10 is a schematic flow diagram of a receiving method for a control instruction in long-distance transmission according to the disclosure. As shown in FIG. 10, the receiving method may include, but is not limited to, the following steps.

At block 101, the receiving device may obtain the UDP packet from the second communication module via the output interface of the second communication module.

According to an embodiment of the disclosure, the receiving device obtains the UDP packet from the second communication module via the output interface of the second communication module, which may include, but is not limited to, the following methods.

Method 1

The receiving device obtains optical signal from the transmitting device, and converts the optical signal into a UDP packet by a second optical module.

The receiving device obtains the UDP packet from the second optical module via an output interface of the second optical module, where the second optical module includes a single-fiber single-mode optical module with a transmission rate no less than a second threshold, and a single-fiber multimode optical module with a transmission rate no less than a second threshold. Optionally, the second threshold value may be 10 Gbps, and the disclosure is not limited.

Method 2

The receiving device obtains the UDP packet from the transmitting device by the second electrical module.

The receiving device obtains the UDP packet from the second electrical module via an output interface of the second electrical module, where the second electrical module comprises an electrical module with a transmission rate no less than the second threshold, and the second electrical module comprises an electrical module with a transmission rate no less than a second threshold. Optionally, the second threshold may be 10 Gbps and is not limited herein.

In method 2, when the second electrical module comprises a second physical interface transceiver (PHY) and a second RJ-45 interface, the receiving device may obtain the UDP packet from the second electrical module via the output interface of the second physical interface transceiver of the second electrical module. It should be noted that the receiving device may obtain the UDP packet from the transmitting device or the switch via the second RJ-45 interface of the second electrical module.

It should be noted that the receiving device obtains the UDP packet from the second communication module via the output interface of the second communication module, which may include, but is not limited to, the following methods.

Method 1

The receiving device obtains optical signal e switch, and converts the optical signal into UDP packet by the second optical module.

The receiving device obtains the UDP packet from the second optical module via the output interface of the second optical module, where the second optical module comprises an optical module with a transmission rate no less than the second threshold.

Method 2

The receiving device obtains the UDP packet from the switch by the second electrical module.

The receiving device obtains the UDP packet from the second electrical module via the output interface of the second electrical module, where the second electrical module comprises an electrical module with a transmission rate no less than the second threshold.

It should be noted that the receiving device converts the optical signal obtained from the transmitting device into the UDP packet via the second optical module, obtains the UDP packet from the second optical module via the output interface of the second optical module. In addition, it can further simultaneously obtain the UDP packet from the transmitting device by the second electrical module.

It should be noted that the above receiving method may also include the following methods.

Method 1

The receiving device obtains the second control instruction from the second control device via a second USB interface, a second RS232 interface, a second I2C interface, a fourth RJ-45 interface, or a second Serial Peripheral Interface (SPI); the second control instruction may include, but is not limited to, a control instruction for restarting the video source device, or a control instruction for switching the video source, etc.

It should be noted that the second USB interface may be a USB interface integrated into the receiving device, here, the second control device may comprise a mouse or a keyboard. The second RS232 interface may be a RS232 interface integrated into the receiving device. The second I2C interface may be an I2C interface integrated into the receiving device. The second SPI interface may be a SPI interface integrated into the receiving device; the fourth RJ-45 interface may be a RJ-45 interface integrated into the receiving device.

The receiving device encapsulates the second control instruction through the UDP communication protocol to obtain a preset UDP packet, and transmits the preset UDP packet to the transmitting device by the second communication module.

It should be noted that before the receiving device obtains the second control instruction from the second control device via the second USB interface, the second RS232 interface, the second I2C interface, the fourth RJ-45 interface, or the second SPI interface, the second control device may receive the second control instruction input from the user (e.g., user clicks the mouse, user hits the keyboard).

Method 2

The receiving device obtains the second control instruction from the second control device via the second USB interface, the second RS232 interface, the second I2C interface, the fourth RJ-45 interface, or the second SPI interface.

The receiving device encapsulates the second control instruction through the UDP communication protocol to obtain the preset UDP packet, and transmits the preset UDP packet to the switch by the second communication module, where the switch is configured to forward the preset UDP packet to the transmitting device.

Method 3

The receiving device may include a first receiving device and a second receiving device.

The receiving method may also include the following.

The first receiving device obtains the second control instruction from the second control device via the second USB interface, the second RS232 interface, the second I2C interface, the fourth RJ-45 interface, or the second SPI interface in the first receiving device, and encapsulates the second control instruction through the UDP communication protocol to obtain a preset UDP packet, and transmits the preset UDP packet via the second communication module in the first receiving device to the transmitting device.

The second receiving device obtains the second control instruction from the second control device via the second USB interface, the second RS232 interface, the second I2C interface, the fourth RJ-45 interface, or the second SPI interface in the second receiving device, encapsulates the second control instruction through the UDP communication protocol to obtain the preset UDP packet, and transmits the preset UDP packet to the transmitting device by second communication module in the second receiving device.

Method 4

The receiving device may include a first receiving device and a second receiving device.

The receiving method may further include the following.

The first receiving device obtains the second control instruction from the second control device via the second USB interface, the second RS232 interface, the second I2C interface, the fourth RJ-45 interface, or the second SPI interface in the first receiving device, encapsulates the second control instruction through the UDP communication protocol to obtain the preset UDP packet, and transmits the preset UDP packet via the second communication module in the first receiving device packet to the switch, where the switch is configured to forward the preset UDP packet to the transmitting device.

The second receiving device obtains the second control instruction from the second control device via the second USB interface, the second RS232 interface, the second I2C interface, the fourth RJ-45 interface, or the second SPI interface in the second receiving device, encapsulates the second control instruction through the UDP communication protocol to obtain the preset UDP packet, and transmits the preset UDP packet to the switch via the second communication module in the second receiving device.

It should be noted that the above-mentioned receiving method may also comprise the following methods.

Method 1

The receiving device receives a second infrared signal by a second infrared receiving tube and converts the second infrared signal into a second control electrical signal, where the second infrared receiving tube comprises: an infrared receiving tube for receiving the infrared signal and integrated into the receiving device.

The receiving device performs, by the second analog-to-digital conversion module, analog-to-digital conversion of the second control electrical signal to obtain a second control instruction.

The receiving device encapsulates the second control instruction through the UDP communication protocol to obtain the preset UDP packet, and transmits the preset UDP packet to the transmitting device by the second communication module.

Method 2

The receiving device receives the second infrared signal by the second infrared receiving tube and converts the second infrared signal into a second control electrical signal.

The receiving device performs, by the second analog-to-digital conversion module, analog-to-digital conversion of the second control electrical signal to obtain a second control instruction.

The receiving device encapsulates the second control instruction through the UDP communication protocol to obtain the preset UDP packet, and transmits the preset UDP packet to the switch by the second communication module, where the switch is configured to forward the preset UDP packet to the transmitting device.

Method 3

The receiving device comprises a first receiving device and a second receiving device.

The receiving method also comprises the following.

The first receiving device receives the second infrared signal by the second infrared receiving tube in the first receiving device, converts the second infrared signal into a second control electrical signal, performs, by the second analog-to-digital conversion module in the first receiving device, analog-to-digital conversion of the second control electrical signal to obtain the second control instruction, encapsulates the second control instruction through the UDP communication protocol, to obtain the preset UDP packet, and transmits the preset UDP packet to the transmitting device by the second communication module in the first receiving device.

The second receiving device receives the second infrared signal by the second infrared receiving tube in the second receiving device, converts the second infrared signal into a second control electrical signal, performs the analog-todigital conversion of the second control electrical signal by the second analog-to-digital conversion module in the second receiving device to obtain a second control instruction, encapsulates the second control instruction through the UDP communication protocol, obtains the preset UDP packet, and transmits the preset UDP packet to the transmitting device through the second communication module in the receiving device.

Method 4

The receiving device comprises a first receiving device and a second receiving device.

The receiving method also comprises the following.

The first receiving device receives the second infrared signal by the second infrared receiving tube in the first receiving device, converts the second infrared signal into a second control electrical signal, performs analog-to-digital conversion of the second control electrical signal by the second analog-to-digital conversion module in the first receiving device to obtain a second control instruction, encapsulates the second control instruction through the UDP communication protocol to obtain the preset UDP packet, and transmits the preset UDP packet to the switch by the second communication module in the first receiving device, where the switch is configured to forward the preset UDP packet to the transmitting device.

The second receiving device receives the second infrared signal via the second infrared receiving tube in the second receiving device, converts the second infrared signal into a second control electrical signal, performs analog-to-digital conversion of the second control electrical signal by the second analog-to-digital conversion module in the second receiving device to obtains a second control instruction, encapsulates the second control instruction through the UDP communication protocol to obtain the preset UDP packet, and transmits the preset UDP packet to the switch by the second communication module in the second receiving device.

It should be noted that after the receiving device obtains the preset UDP packet, the receiving method further includes the following.

The receiving device designs the preset UDP packets into multiple cyclic superframes and transmits the multiple cyclic superframes to the transmitting device or switch, where individual UDP packet in the superframes occupies a fixed proportion of time.

The preset UDP packet includes at least one of the following.

A preset UDP packet encapsulated with the second control instruction obtained via the second USB interface, a preset UDP packet encapsulated with the second control instruction obtained via the second RS232 interface, a preset UDP packet encapsulated with the second control instruction obtained via the second I2C interface, a preset UDP packet encapsulated with the second infrared signal received via the second infrared receiving tube, a preset UDP packet converted from the second infrared signal. Where a fourth RJ-45 interface comprises a RJ-45 interface integrated into the receiving device, and a second SPI interface comprises a SPI interface integrated into the receiving device.

The receiving device designs the preset UDP packets as a plurality of cyclic superframes, which may comprise the following steps.

The receiving device designs the preset UDP packet and the UDP packet encapsulated with audio and video data as multiple looping superframes.

At block 102, the receiving device may decapsulate the UDP packet through the UDP communication protocol to obtain the first preset control instruction.

Specifically, the receiving device decapsulates the UDP packet through the UDP communication protocol to obtain the first preset control instruction, which may include the following.

The receiving device removes the UDP protocol header and UDP protocol tail of the UDP packet to obtain the first preset control instruction. The first preset control instruction is used by the receiving device to control the display device connected to the receiving device.

After the receiving device has decapsulated the UDP packet through the UDP communication protocol to obtain the first preset control instruction, the receiving method may also comprise the following process.

The receiving device converts the first preset control instruction into the first preset control electrical signal by the second digital-to-analog conversion module.

The receiving device converts the first preset control electrical signal into the first preset infrared signal.

The receiving device transmits the first preset infrared signal to the display device connected to the receiving device by the second infrared emitting tube, where the first preset infrared signal is used by the receiving device to control the display device connected to the receiving device, and the second infrared emitting tube for emitting infrared signal is integrated into the receiving device.

The disclosure provides a transmitting device for control instructions in long-distance transmission, and the transmitting device can be configured to implement the method described in the embodiment of FIG. 1. The transmitting device for a control instruction in long-distance shown in FIG. 11 may be used to perform what is described in the embodiment of FIG. 1.

Figure 11:
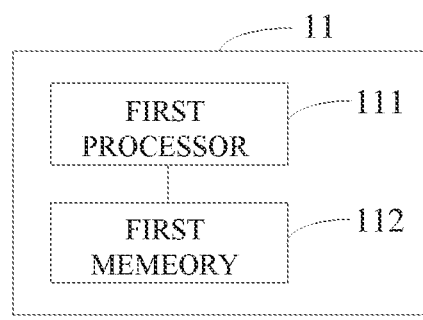
FIG. 11 is a schematic flowchart of a transmitting method for a control instruction in long-distance transmission according to the disclosure.

As shown in FIG. 11, the transmitting device 11 may include, but is not limited to, a first memory 112 and a first processor 111 coupled to the first memory 112.

The first memory 112 may be configured specifically to store a first application program instruction.

The first processor 111, specifically, may be configured to call the first application instruction stored in the first memory 112 to implement the transmitting method for control instruction long-distance in transmission described in FIG. 1.

Specifically, the first processor 111 may be configured to call the first application instruction to perform the following.

The first control instruction is obtained via the USB interface, the RS232 interface, the I2C interface, the SPI interface or the RJ-45 interface, and the first control instruction may include, but is not limited to, a control instruction for rebooting device, a control instruction for adjusting the volume, a control instruction for adjusting the brightness, and other control instructions.

The first control instruction is encapsulated through the UDP protocol to obtain the UDP packet.

The UDP packet is transmitted to the first communication module via the input interface of the first communication module.

It should be understood that transmitting device 11 is only one example provided in embodiments of the disclosure, the transmitting device 11 may have more or fewer components than shown, may combine two or more components, or may be implemented with different configurations of components.

It will be understood that specific implementations of the functional components included in the transmitting device 11 of FIG. 11 may be referred to the embodiment of FIG. 1 and will not be repeated herein.

The disclosure provides a receiving device for a control instruction in long-distance transmission, the receiving device can be configured to implement the method described in the embodiment of FIG. 10. The receiving device for a control instruction in long-distance transmission shown in FIG. 12 can be configured to perform what is described in the embodiment of FIG. 10.

Figure 12:
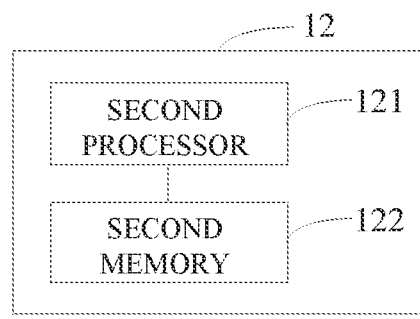
FIG. 12 is a schematic flowchart of a receiving method for a control instruction in long-distance transmission according to the disclosure.

As shown in FIG. 12, the receiving device 12 may include, but is not limited to, a second memory 122 and a second processor 121 coupled to the second memory 122.

The second memory 122 may be configured specifically to store a second application program instruction.

The second processor 121, specifically, may be configured to call the second application program instruction stored in the second memory 122 to implement the receiving method for a control instruction in long-distance described in FIG. 12.

Specifically, the second processor 121 may be configured to call the second application program instruction to perform the following.

A UDP packet is obtained from the second communication module via the output interface of the second communication module.

The UDP packet is decapsulated to obtain the first preset control instruction through the UDP communication protocol, the first preset control command is used by the receiving device 12 to control the display device connected to the receiving device 12.

It should be understood that the receiving device 12 is only one example provided in embodiments of the disclosure, the receiving device 12 may have more or fewer components than shown, may combine two or more components, or may have different configurations of components implemented.

It will be understood that specific implementations of the functional components included in the receiving device 12 of FIG. 12 may be referred to the embodiment of FIG. 10 and will not be repeated herein.

Those ordinary skilled in the art may realize that the modules and algorithm steps of each example described in combination with the implementations of the disclosure can be performed by electronic hardware, computer software, or a combination thereof. In order to clearly explain the interchangeability of hardware and software, the composition and steps of each example have been described generally in terms of functions in the above description. Whether these functions are performed in hardware or software depends on the specific application and design constraints of the technical solution. Professional technicians can use different methods to implement the described functions for each specific application, but such implementation should not be considered to be beyond the scope of the disclosure.

Those skilled in the art can clearly understand that, for the convenience and brevity of the description, the specific working processes of the devices and modules described above can refer to the corresponding processes in the foregoing implementations of method, and are not repeated here.

In the several implementations provided in the disclosure, it should be understood that the disclosed equipment, device, and method may be implemented in other ways. For example, to describe the composition and steps of each example. Whether these functions are executed in hardware or software depends on the specific application of the technical solution and design constraints. Professional technicians can use different methods to implement the described functions for each specific application, but such implementation should not be considered beyond the scope of this disclosure.

The implementations of device and equipment described above are only schematic. For example, the division of the modules is only a logical function division. In actual implementation, there may be another division manner. For example, multiple modules or components may be combined or integrated into another device, or some features can be ignored or not be implemented. In addition, the displayed or discussed mutual coupling or direct coupling or communication connection may be indirect coupling or communication connection via some interfaces, equipment, devices or modules, and may also be electrical, mechanical or other forms of connection.

The modules described as separate components may or may not be physically separated, and the components displayed as modules may or may not be physical modules, may be located in one place, or may be distributed on multiple network modules. Some or all of the modules may be selected according to actual needs to achieve the objects of the solutions in the implementations of the disclosure.

In addition, each functional module in each implementation of the disclosure may be integrated into one processing module, or each module may exist separately physically, or two or more modules may be integrated into one module. The above integrated modules may be implemented in the form of hardware or software functional modules.

When the integrated module is implemented in the form of a software functional module and sold or used as an independent product, it can be stored in a computer-readable storage medium. Based on this understanding, the technical solution of the disclosure essentially or a part that contributes to the existing technology, or all or part of the technical solution may be embodied in the form of a software product. The computer software product is stored in a storage medium which includes instructions to enable a computer device (which may be a personal computer, a server, or a network device, etc.) to perform all or part of the steps of the method described in the implementations of the disclosure. The foregoing storage media include: U-disks, mobile hard disks, read-only memory (ROM), random access memory (RAM), magnetic disks, or optical disks and other media that can store program codes.

The above is only a specific implementation of the disclosure, but the scope of protection of the disclosure is not limited to this. Any person skilled in the art can easily think of various equivalent modifications or replacements within the technical scope disclosed in the disclosure which should be covered by the protection scope of the disclosure. Therefore, the protection scope of the disclosure shall be subject to the protection scope of the claims.

What is claimed is:

1. A transmitting method for a control instruction in long-distance transmission, comprising:
   obtaining, by a transmitting device, a first control instruction;
   encapsulating, by the transmitting device, the first control instruction into a UDP packet; and
   transmitting, by the transmitting device, the UDP packet to a first communication module via an input interface of the first communication module, wherein
   after transmitting the UDP packet by the transmitting device to the first communication module via the input interface of the first communication module, the transmitting device makes the UDP packet input to the first communication module into a plurality of cyclic superframes, wherein each of the plurality of cyclic superframes occupies a fixed proportion of time.

2. The transmitting method according to claim 1, wherein transmitting, by the transmitting device, the UDP packet to the first communication module via the input interface of the first communication module, comprises:
transmitting, by the transmitting device, the UDP packet to a first optical module via an input interface of the first optical module; wherein the first optical module is configured to convert the UDP packet into an optical signal, and the first optical module comprises an optical module with a transmission rate no lower than a first threshold; and/or
transmitting, by the transmitting device, the UDP packet to a first electrical module via an input interface of the first electrical module; wherein the first electrical module comprises an electrical module with a transmission rate no lower than the first threshold, and the electrical module with the transmission rate not lower than the first threshold comprises a first physical transceiver and a first RJ-45 interface.

3. The transmitting method according to claim 2, wherein the transmitting method further comprises:
after transmitting, by the transmitting device, the UDP packet to the first optical module via the input interface of the first optical module, converting, by the transmitting device, the UDP packet into an optical signal by the first optical module; and
transmitting, by the transmitting device, the optical signal to a switch; wherein the switch is configured to forward the optical signal to a receiving device connected to the switch.

4. The transmitting method according to claim 3, wherein the receiving device comprises a first receiving device and a second receiving device; and
the transmitting method further comprises:
after transmitting, by the transmitting device, the UDP packet to the first optical module via the input interface of the first optical module, converting the UDP packet into an optical signal by the first optical module; and
transmitting, by the transmitting device, the optical signal to a switch; wherein the switch is configured to forward the optical signal to the first receiving device and the second receiving device, respectively.

5. The transmitting method according to claim 2, wherein the transmitting method further comprises:
after transmitting, by the transmitting device, the UDP packet to the first electrical module via the input interface of the first electrical module, transmitting, by the transmitting device, the UDP packet by the first electrical module to a switch; wherein the switch is configured to forward the UDP packet to the receiving device connected to the switch.

6. The transmitting method according to claim 5, wherein the receiving device comprising a first receiving device and a second receiving device; and
the transmitting method further comprises:
after transmitting, by the transmitting device, the UDP packet to the first electrical module via the input interface of the first electrical module, transmitting the UDP packet by the transmitting device to the switch by the first electrical module; wherein
when the switch is connected to the receiving device, the switch is configured to forward the UDP packet to the first receiving device and the second receiving device respectively.

7. The transmitting method according to claim 2, wherein the transmitting method further comprises:
after transmitting, by the transmitting device, the UDP packet to the first optical module via the input interface of the first optical module, converting, by the transmitting device, the UDP packet into an optical signal by the first optical module, transmitting the optical signal by the transmitting device to the receiving device; or
transmitting, by the transmitting device, the UDP packet to the receiving device via the first electrical module.

8. The transmitting method according to claim 7, wherein the receiving device comprises a first receiving device and a second receiving device; and
the transmitting method further comprises:
after transmitting the UDP packet by the transmitting device to the first optical module via the input interface of the first optical module, converting, by the transmitting device, the UDP packet into an optical signal by the first optical module, transmitting, by the transmitting device, the optical signal to the first receiving device and the second receiving device, respectively; or
transmitting, by the transmitting device, the UDP packet to the first receiving device and the second receiving device, respectively, by the first electrical module.

9. The transmitting method according to claim 1, wherein obtaining the first control instruction by the transmitting device comprises:
obtaining, by the transmitting device, the first control instruction from a first control device via a first USB interface; wherein the first USB interface comprising a USB interface integrated into the transmitting device;
obtaining, by the transmitting device, the first control instruction from the first control device via a first RS232 interface; the first RS232 interface comprising a RS232 interface integrated into the transmitting device;
obtaining, by the transmitting device, the first control instruction from the first control device via a first I2C interface; the first I2C interface comprising an I2C interface integrated into the transmitting device; or
obtaining, by the transmitting device, the first control instruction from the first control device via a third RJ-45 interface; the third RJ-45 interface comprising a RJ-45 interface integrated into the transmitting device.

10. The transmitting method according to claim 9, wherein
obtaining the first control instruction by the transmitting device, comprises:
receiving, by the transmitting device, the first infrared signal via a first infrared receiving tube and converting the first infrared signal into a first control electrical signal;
performing, by the transmitting device, an analog-to-digital conversion of the first control electrical signal by a first analog-to-digital conversion module to obtain the first control instruction.

11. The transmitting method according to claim 1, wherein the transmitting method further comprises:
decapsulating, by the transmitting device, the preset UDP packet to obtain a second preset control instruction;
converting, by the transmitting device, the second preset control instruction via the first digital-to-analog conversion module to obtain a second preset control electrical signal; and
controlling, by the transmitting device, the first infrared emitting tube to transmit a second preset infrared signal according to the second preset control signal; the second preset infrared signal being used for the transmitting device to control a video source device connected to the transmitting device.

12. The transmitting method according to claim 10, wherein
the transmitting method further comprises:
transmitting the plurality of cyclic superframes to the receiving device or switch;
wherein the UDP packet input to the communication module comprises at least one of the following:
the UDP packet encapsulated with the first control instruction obtained via the first USB interface, the UDP packet encapsulated with the first control instruction obtained via the first RS232 interface, the UDP packet encapsulated with the first control instruction obtained via the first I2C interface, the UDP packet encapsulated with the first control instruction obtained by conversion of the first infrared signal, or the UDP packet encapsulated with the first control instruction obtained via the third RJ-45 interface.

13. A receiving method for a control instruction in long distance, wherein comprising:
obtaining, by a receiving device, a user datagram protocol (UDP) packet from a second communication module via an output interface of the second communication module, wherein the UDP packet comprises a plurality of cyclic superframes, and wherein each of the plurality of cyclic superframes occupies a fixed proportion of time;
decapsulating, by the receiving device, the UDP packet through a UDP communication protocol to obtain a first preset control instruction; the first preset control instruction being used for the receiving device to control a display device connected to the receiving device.

14. The receiving method according to claim 13, wherein
obtaining, by the receiving device, the UDP packet from the second communication module via the output interface of the second communication module, comprising:
converting, by the receiving device, an optical signal obtained from the transmitting device into the UDP packet by the second optical module;
obtaining, by the receiving device, the UDP packet from a second optical module via an output interface of the second optical module; the second optical module comprising: an optical module with a transmission rate not lower than a second threshold; and/or
obtaining, by the receiving device, the UDP packet from the transmitting device by a second electrical module;
obtaining, by the receiving device, the UDP packet from the second electrical module via an output interface of the second electrical module; the second electrical module comprising: an electrical module with a transmission rate not lower than the second threshold; the electrical module with the transmission rate not lower than the second threshold comprising: a second physical transceiver and a second RJ-45 interface.

15. The receiving method according to claim 13, wherein
obtaining, by the receiving device, the UDP packet from the second communication module via the output interface of the second communication module, comprising:
converting, by the receiving device, the optical signal obtained from a switch into the UDP packet by the second optical module;
obtaining, by the receiving device, the UDP packet from the second optical module via the output interface of the second optical module; the second optical module comprising: an optical module with a transmission rate not lower than the second threshold; or
obtaining, by the receiving device, the UDP packet from the switch by the second electrical module;
obtaining, by the receiving device, the UDP packet from the second electrical module via the output interface of the second electrical module; the second electrical module comprising: an electrical module with a transmission rate not less than the second threshold; the electrical module with the transmission rate not less than the second threshold comprising: a second physical transceiver and a second RJ-45 interface.

16. The receiving method according to claim 13, wherein the receiving method further comprising:
obtaining, by the receiving device, a second control instruction from a second control device via a second USB interface, a second RS232 interface, a second I2C interface or a fourth RJ-45 interface; the second USB interface comprising a USB interface integrated into the receiving device; the second RS232 interface comprising a RS232 interface integrated into the receiving device; the second I2C interface comprising an I2C interface integrated into the receiving device; the fourth RJ-45 interface comprising a RJ-45 interface integrated into the receiving device;
encapsulating, by the receiving device, the second control instruction through the UDP communication protocol to obtain the preset UDP packet, transmitting, by the second communication module, the preset UDP packet to the transmitting device or the switch; the switch being used to forward the preset UDP packet to the transmitting device.

17. The receiving method according to claim 16, wherein the receiving method further comprising:
receiving, by the receiving device, the second infrared signal by a second infrared receiving tube and converting the second infrared signal into a second control electrical signal;
performing, by the receiving device, an analog-to-digital conversion of the second control electrical signal by a second analog-to-digital conversion module to obtain a second control instruction; and
encapsulating, by the receiving device, the second control instruction through the UDP communication protocol to obtain the preset UDP packet and transmitting, by the second communication module, the preset UDP packet to the transmitting device or the switch; the switch configured to forward the preset UDP packet to the transmitting device.

18. The receiving method according to claim 13, wherein the receiving method further comprising:
after decapsulating, by the receiving device, the UDP packet through the UDP communication protocol to obtain the first preset control instruction, converting, by the receiving device, the first preset control instruction into a first preset control electrical signal by a second digital-to-analog conversion module;
converting, by the receiving device, the first preset control electrical signal into the first preset infrared signal; and
transmitting, by the receiving device, the first preset infrared signal by a second infrared emitting tube; the first preset infrared signal being used by the receiving device to control a display device connected to the receiving device.

19. A transmitting device for a control instruction, comprising:

a first memory configured to store a first application program instruction; and a first processor coupled to the first memory and configured to invoke the first application program instruction to:

obtain a first control instruction;

encapsulate the first control instruction into a (UDP) packet; and transmit the UDP packet to a first communication module via an input interface of the first communication module, wherein after transmitting the UDP packet by the transmitting device to the first communication module via the input interface of the first communication module, the transmitting device makes the UDP packet input to the first communication module into a plurality of cyclic superframes, wherein each of the plurality of cyclic superframes occupies a fixed proportion of time.

20. A receiving device for a control instruction, comprising:

a second memory configured to store a second application program instruction; and a second processor coupled to the second memory and configured to invoke the second application program instruction to:

obtain a user datagram protocol (UDP) packet from a second communication module via an output interface of the second communication module, wherein the UDP packet comprises a plurality of cyclic superframes, and wherein each of the plurality of cyclic superframes occupies a fixed proportion of time; and decapsulate the UDP packet through a UDP communication protocol to obtain a first preset control instruction; wherein the first preset control instruction being used by the receiving device to control a display device connected to the receiving device.

* * * * *